United States Patent Office 3,442,609
Patented May 6, 1969

3,442,609
PROCESS OF PURIFYING PHOSPORIC ACID
John N. Carothers and Rudolph J. Hurka, Jr., both of 1629 Lady Marion Lane NE., Atlanta, Ga. 30309
No Drawing. Continuation-in-part of application Ser. No. 269,808, Apr. 1, 1963. This application Feb. 9, 1965, Ser. No. 431,457
Int. Cl. C01b 25/22
U.S. Cl. 23—165  9 Claims This invention relates to a process for the removal of compounds of Al, F, Si, and $SO_4^=$ from wet process phosphoric acid and is an improvement on the process described and claimed in our application Ser. No. 269,808, filed Apr. 1, 1963, and now abandoned.

Broadly, the principal object of our invention is to obtain a purified phosphoric acid made by the wet process which shall be substantially free of aluminum, fluorine and silicon.

Another object of our invention is to provide a process for the removal of the impurities Al, F, and Si, from wet-process phosphoric acid which shall be simple and economical of operation and which shall produce compounds having commercial value from the recovered impurities.

In our application aforesaid, we describe a process for the removal of the impurities Al, Si, F, and $SO_4^=$ from wet-process phosphoric acid. The removal of the impurities in the form of a complex crystalline compound is brought about by adjusting the mole ratios of Al, Si, F, $SO_4^=$, and Ca in the acid in a way so that the following mole ratios exist:

$$Al:Si:F:SO_4^=:Ca$$
$$1:0.8-1:12-16:1.5-2:4-8$$

While the process described and claimed in our previously filed application, aforesaid, has proved eminently successful in operation, we have now found means whereby the results obtained by said process may be attained in a simpler, more economical way, resulting in substantial savings.

Phosphoric acid produced by the wet process and usually having a $P_2O_5$ content of 25-32%, when separated from its accompanying solids, principally gypsum, formed during its production, contains aluminum, silicon, fluorine, sulfate ($SO_4^=$) and calcium in solution in which the percentages of said substances may be represented as:

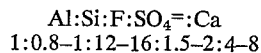
$$Al:Si:F:SO_4^=:Ca$$
$$0.2-0.6\%:0.3-0.6\%:2-3\%:1-4\%:0.1-0.6\%$$

The silicon present in the acid is usually in excess of the amount necessary to provide the Al/Si mole ratio of 1/0.8–1. The fluorine present is usually insufficient for the mole ratio of F/Al 12–16/1. In our application aforesaid we adjust these ratios by adding aluminum in a suitable form, and by adding fluorine in the form of hydrofluoric acid to the acid being treated.

We have discovered that the proportioning of the reactants may be made by means that are technically and economically more desirable than those described in our application aforesaid.

It is accordingly one object of our invention to provide a process whereby the mole ratios of aluminum, silicon, and fluorine, in wet process acid may be adjusted to Al 1:Si 0.8–1:F 12–16 without the necessity of adding aluminum or compounds of aluminum to the acid being treated.

Another object of our invention is to provide a process whereby the mole ratios of aluminum, silicon, and fluorine in wet process acid may be adjusted to Al/Si/F equal to 1.0/0.8–1/12–16 without the necessity of adding aluminum and hydrofluoric acid to the acid being treated.

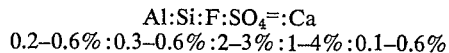

A still further object of our invention is to provide a process for the removal of the impurities Al, F, Si, and $SO_4^=$ from wet process phosphoric acid wherein the mole ratio of fluorine to the other impurities in the acid may be adjusted by first removing a part of the silicon in the acid and then adjusting the fluorine content by adding a fluorine containing salt to the acid.

Another object of our invention is to provide a process for the removal of the impurities Al, F, Si and $SO_4^=$ from wet process phosphoric acid wherein the mole ratios of the impurities are adjusted to a predetermined amount, which process shall be continuous in operation and wherein the calcium requirement to adjust said impurities shall be met by recycling the defluorination slurry to which limestone or calcium carbonate has been added.

Instead of adding aluminum in the amount required to obtain the desired proportion of Al to Si, we have found that it may be established by the removal of Si, as $Na_2SiF_6$, in the amount required to establish the proper proportion of Al/Si, and the defluorination then may be conducted as described in our pending application aforesaid.

After the removal of silicon from the wet-process acid, in the amount necessary to bring about a suitable Ai/Si ratio, the precipitation of the impurities Al, Si, F and $SO_4$ may be carried out either by adding the required fluoride as HF, and continuing the defluorination as described in our previously filed application aforesaid, or by adding the required fluoride as a sodium salt of hydrofluoric acid, such as NaF, or $NaHF_2$, in the manner and by the means hereinafter described. In either case, the impurities are removed as the complex crystalline solid described in our pending application Ser. No. 269,808.

Raw, wet-process acid, as it is separated from accompanying solids, is usually at a temperature of around 60° C. After analysis to determine its Al, Si, F and $SO_4$ content, we may treat the acid with sodium carbonate in an amount limited to the quantity necessary to react with and remove from the acid sufficient silicon as $Na_2SiF_6$ so that the mole ratio of the aluminum in the acid to the remaining silicon shall be 1:0.8–1. As various wet-process acids have different initial aluminum and silicon contents, the quantity of silicon to be removed depends not only upon the quantity of silicon initially present, but also upon the quantity of aluminum initially present.

Instead of sodium carbonate we may use a sodium salt of orthophosphoric acid, such as monosodium, disodium or trisodium phosphate. In either case, the salt selected reacts with the fluosilicate in the acid to produce sodium fluosilicate which may be readily separated from the acid.

The temperature of operation of 60° C. is not critical but is mentioned because this temperature approximates that of the wet-process acid as it comes from the filters where it has been separated from the gypsum. The process may be carried out conveniently at temperatures of from 15° C. to 60° C., or somewhat above.

After the addition of the sodium salt in the amount required to precipitate the quantity of sodium fluosilicate to adjust the Al/Si ratio, the solids which are formed are allowed to settle. The clear portion of the acid, amounting to about 90%, is separated by decantation and the balance of the acid is separated from the crystalline sodium fluosilicate by any convenient means such as filtration or centrifuging.

Instead of adding the sodium salt to the entire quantity of acid to be treated, we may add the salt to only a portion of the acid, removing therefrom the same quantity of sodium fluosilicate as if the salt were added to the entire quantity of acid. When this portion of treated acid is added to the remainder of the acid, the proper Al/Si ratio will have been obtained. The requirement in this procedure is to remove sufficient silicon from the portion of the acid being treated so that, when added to the untreated acid the required ratio of Al/Si=1/0.8–1 is attained.

Having adjusted the Al/Si ratio in the manner described above, the aluminum to fluorine mole ratio of 1:12–16 may be brought about by adding the required quantity of hydrofluoric acid to adjust the amount of fluorine in the acid, by following the procedure of our pending application Ser. No. 269,088.

Instead of adjusting the mole ratio of aluminum to fluorine by the addition of hydrofluoric acid, we may accomplish the same purpose more economically by the following procedure:

We first form a defluorination slurry by bringing together, in a suitable vessel, with vigorous mixing, wet-process acid, adjusted for correct Al/Si ratio, a sodium salt of hydrofluoric acid, such as NaF or NaHF$_3$, preferably dissolved in phosphoric acid, and calcium, in the form of a calcium salt of orthophosphoric acid, or calcium, both in solution and as a precipitated orthophosphate.

When the components are brought together and mixed in proportions to provide the mole ratios mentioned hereinbefore, a complex crystallne solid, containing as major constituents, aluminum, silicon, fluorine, sulfate, calcium and water of crystallization is formed. The resulting slurry is referred to as defluorination slurry.

In a continuous operation, to the body of the defluorination slurry, we add simultaneously, and in proportions necessary to form the complex crystalline solid, the sodium salt of hydrofluoric acid, preferably dissolved in defluorinated acid, wet-process acid adjusted for correct Al/Si ratio, and calcium in the form of a calcium salt of orthophosphoric acid. The calcum so added is in the form of a slurry resulting from the reaction of calcium carbonate or limestone with either a suitable quantity of previously filtered defluorinated acid, or, with defluorination slurry either of which may be used in recycle. The quantity of acid, or defluorination slurry, used in recycle to introduce the calcium required for defluorination, is not critical; and is determined by consideratons of economy and convenience. Our preferred method of introducing the sodium salt of hydrofluoric acid is by means of a solution of NaF in filtered defluorinated acid from which calcium may have been removed.

It is important that the sodium salt of hydrofluoric acid be added to the defluorination slurry rather than directly to the acd in which the aluminum-silicon ratio has been adjusted for the following reason:

The wet-process acid adjusted to the proper Al/Si ratio still contains considerable amounts of fluosilicate. When a sodium salt of hydrofluoric acid alone is added directly to the adjusted acid, the sodium salt acts to precipitate compounds, the removal of which from the acid, causes an imbalance of the aluminum-silicon ratio. When this occurs, addition of Ca, in the proper form, does not bring about the substantially complete precipitation of the impurities Al, Si, F, and, sulfate as the aforementioned complex crystalline compound. Accordingly, the situation must be brought about that all of the required reactants Ca, Al, Si, F, So$_4$= and H$_2$O necessary to form the desired complex crystalline compound, are brought together under conditions and at concentrations so that the said complex is formed. The operations hereinbefore described bring this about. The acid thus treated contains residual fluorine at a concentration in the range 0.1 to 0.3%, and the aluminum and silicon are substantially completely removed.

The following is a typical example in which our process has been operated in a continuous manner to purify commercially produced wet-process phosphoric acid.

The acid has the following composition:

| | Percent |
|---|---|
| Ca | 0.14 |
| Al | 0.313 |
| Si | 0.496 |
| F | 2.52 |
| SO$_4$= | 2.27 |
| P$_2$O$_5$ | 30.0 |

The mole ratios in this starting acid, based on Al=1.000, were:

Al:Si:F:So$_4$=Ca
1.000:1.522:11.43:2.04:0.0035

The acid was adjusted to a mole ratio of Al/Si of 1/0.85 by reaction with sodium carbonate at 60° C., and separation of the sodium fluosilicate which formed. Sodium carbonate was added in the amount of 10.75 parts sodium carbonate per 1000 parts starting acid. The adjusted acid was separated from the solid sodium fluosilicate by decantation and filtration. The sodium fluosilicate so recovered may be used for any desired purpose. After the precipitation and separation of the sodium fluosilicate, the mole ratios in the adjusted acid, based on Al=1.000, were:

Al:Si:F:So$_4$=Ca
1.000:0.85:7.40:2.04:0.0035

By combining phosphoric acid adjusted for Al/Si mole ratio of 1/0.85 as just described, calcium orthophosphate (Ca=36.8%, as used) and sodium fluoride, in the proportions of 100 parts adjusted acid, 8.22 parts calcium orthophosphate and 3.83 parts NaF, a slurry is formed in which the mole ratios, based on Al=1.000, are:

Al:Si:F:So$_4$=Ca
1.000:0.85:15.3:2.04:6.88

In a slurry of such composition, the aforementioned complex crystalline compound containing calcium, aluminum, silicon, fluorine, sulfate and water of crystallization as major components, forms and separates as a solid phase. A quantity of gypsum, small in comparison to the quantity of the complex compound, may also form as a solid phase.

As operated in a continuous manner; to 620 parts of a slurry so formed, there were added simultaneously, and during a time interval of approximately 90 minutes, 977 parts wet-process acid adjusted for Al/Si mole ratio of 1.000/0.85, as described above 37.3 parts NaF (99.5%) dissolved in 294 parts previously purified phosphoric acid 80.0 parts calcium orthophosphate (calcium content 36.8%)

The temperature of the slurry was maintained in the temperature range 58–62° C. throughout the addition. The complex crystalline compound formed continuously during the addition. A portion of the slurry so formed was wthdrawn and maintained at a temperature in the range 58–62° C. for an additional period of two hours and then the solid phase was separated from the slurry by filtration. The liquid phase so separated contained 0.23% F, 0.03% Al, and 1.04% Ca, and was substantially free of Si. The solid phase contained a small quantity of gypsum which formed and separated as a crystalline material along with the complex crystalline compound.

The phosphoric acid which was used to dissolve the sodium fluoride was prepared by removing the calcium content of a previously defluorinated acid by reaction with sulfuric acid in amount required to precipitate the calcium content substantially completely as gypsum, and separating the gypsum. The phosphoric acid containing the dissolved sodium fluoride was maintained in the temperature range 65–85° C. prior to addition to the defluorination slurry. The wet-process phosphoric acid, adjusted for Al/Si mole ratio of 1.000/0.85, was maintained at 60° C. prior to addition to the defluorination slurry.

As will be seen from the foregoing example, the addition of the reactants in the required proportions may be continued indefinitely, with periodic or continuous withdrawal of defluorination slurry, and subsequent separation of the solids from the purified acid.

The fact that Al is no longer required as an addition agent as described in our previously filed application Ser. No. 269,808 is important not only because of the savings resulting from the cost of the Al, or its compounds, and the elimination of the need for equipment for handling, storage and transport of this material, but principally because more important savings are realized from the fact that the requirement for the addition of fluoride is greatly reduced, since the fluoride addition is proportioned on the basis of the total aluminum content.

As commercially produced, wet-process phosphoric acid, as it comes from the filters where it has been separated from the gypsum, usually contains sufficient sulfate ion for substantially complete formation and precipitation of the complex fluorine-containing compound formed by establishing the proper aluminum-silicon-fluorine-sulfate-calcium ratios. When the moles of $SO_4^=$ exceed the moles of Si in the adjusted acid, the condition for the substantially complete formation of the complex compound with respect to the quantity of sulfate required is met. When there is an excess of $SO_4^=$ present, a portion will be precipitated as gypsum upon the addition of the calcium orthophosphate. Accordingly a slight excess of $SO_4^=$ is not harmful or critical.

The fluorine containing compounds recovered in carrying out our process may be further processed to produce hydrofluoric acid and sodium salts thereof for reuse in this process, and the production of other fluorides useful in the arts. It will be seen, therefore, from the foregoing, that we have developed an improved process for the removal of impurities from wet-process phosphoric acid which may be easily carried out and from which useful byproducts are obtained.

While certain illustrative embodiments of our invention have been given in the foregoing, it is to be understood that other embodiments will be apparent therefrom and may be practiced within the scope of our invention, and that we do not intend to belimited except as indicated in the following patent claims.

What we claim is:

1. In a process of removing the impurities Al, Si, F, and $SO_4^=$ from wet-process phosphoric acid in which the mole ratios of said impurities are adjusted to approximately the following:

$$Al:Si:F:SO_4^=:Ca$$

$$1:0.8-1:12-16:1.5-2:4-8$$

the steps which comprise,
 (a) adding a sodium salt selected from the group consisting of sodium carbonate and a sodium salt of orthophosphoric acid to wet-process acid in an amount to react with and precipitate sufficient Si as $Na_2SiF_6$ so that the Si in the acid from which the said impurities are being removed shall be at said mole ratio with Al,
 (b) separating the $Na_2SiF_6$ from the acid, and
 (c) adding a sodium salt of hydrofluoric acid to the acid being treated in an amount so that the F in the acid is at said mole ratio with Al.

2. In a process as defined in claim 1, dividing the acid from which the said impurities are being removed into portions, adding the sodium salt selected from the group consisting of sodium salts of orthophosphoric acid and sodium carbonate to one portion in an amount to react with and precipitate sufficient Si as $Na_2SiF_6$ so that, on recombining the portions of acid, the Si in all the acid shall be at said mole ratio with Al.

3. In a process of removing the impurities Al, Si, F, $SO_4^=$ and Ca from wet-process phosphoric acid in which the mole ratios of said impurities are adjusted to approximately the following:

$$Al:Si:F:SO_4^=:Ca$$

$$1:0.8-1:12-16:1.5-2:4-8$$

the steps which comprise,
 (a) adding a sodium salt selected from the group consisting of sodium salts of orthophosphoric acid and sodium carbonate to the acid in an amount to react with and precipitate sufficient Si as $Na_2SiF_6$ so that the Si in the acid from which the said impurities are being removed shall be at said mole ratio with Al,
 (b) separating the $Na_2SiF_6$ from the acid,
 (c) adding a sodium salt of hydrofluoric acid dissolved in defluorinated phosphoric acid to the acid being treated in an amount to produce the said mole ratio of fluorine with Al, and
 (d) adding a calcium salt of orthophosphoric acid to the acid being treated in an amount to provide the mole ratio of Al/Ca of 1/4-8.

4. In a process of producing substantially fluorine-free phosphoric acid from wet-process phosphoric acid containing as impurities compounds of Al, F, S, and $SO_4^=$, the steps which comprise,
 (a) adding sufficient sodium salt selected from the group consisting of sodium carbonate and sodium salts of orthophosphoric acid to at least a part of the acid to react with and precipitate sufficient Si therefrom as $Na_2SiF_6$ so that when the parts of acid are combined the mole ratio of Al in the total acid to the Si in the acid shall be approximately 1:0.8-1,
 (b) separating the $Na_2SiF_6$ from the acid,
 (c) recombining the parts of acid, and
 (d) adding a sodium salt of hydrofluoric acid to the acid being treated in an amount so that the mole ratio of the Al in the acid to the F in the acid shall be approximately 1:12-16.

5. The process of purifying phosphoric acid made by the wet process and which contains as impurities compounds of Al, F, Si, and $SO_4^=$, which comprises,
 (a) adding sufficient sodium salt selected from the group consisting of sodium carbonate and sodium salts of orthophosphoric acid to the acid being treated to react with and precipitate sufficient Si as $Na_2SiF_6$ so that the mole ratio of Al in the acid to the remaining Si in the acid shall be approximately 1:0.8-1,
 (b) separating the $Na_2SiF_6$ from the acid,
 (c) adding a sodium salt of hydrofluoric acid to the acid being treated in an amount so that the mole ratio of the Al in the acid being treated to the F therein shall be approximately 1:12-16, and
 (d) adding to the acid being treated a calcium salt of orthophosphoric acid so that the mole ratio of Al to Si, to F, to $SO_4^=$, to Ca shall be approximately 1 to 0.8-1, to 12-16, to 1.5-2, to 4-8 whereby to form and precipitate a complex crystalline compound containing said impurities as components.

6. The process of purifying wet-process phosphoric acid containing compounds of aluminum, silicon, fluorine and sulfate as impurities which comprises
 (a) adding sufficient sodium salt selected from the group consisting of sodium carbonate and sodium salts of orthophosphoric acid to the acid to react with and precipitate sufficient Si as $Na_2SiF_6$ to establish an Al/Si mole ratio of 1/0.8-1,
 (b) separating the $Na_2SiF_6$ from the acid,
 (c) adding to the acid being treated sufficient fluoride selected from the group consisting of hydrofluoric acid, sodium hydrogen fluoride and sodium fluoride to provide an Al/F mole ratio of 1/12-16,
 (d) adding sufficient calcium orthophosphate to the acid being treated to provide an Al/Ca ratio of 1/4–8 and thereby to bring about a reaction with the other impurities and form a defluorination slurry containing a complex crystalline compound containing calcium, aluminum, silicon, fluorine and sulfate as components, and (e) separating the complex crystalline compound from the acid.

7. A process as defined in claim 6 in which a part of the defluorination slurry is withdrawn and reacted with a calcium compound selected from the group consisting of calcium carbonate and limestone, thereby forming calcium orthophosphate, which is employed to introduce the calcium component into the acid being treated.

8. The process of purifying wet-process phosphoric acid containing compounds of aluminum, silicon, fluorine and sulfate as impurities, which comprises (a) adding sufficient sodium salt selected from the group consisting of sodium carbonate, and sodium salts of orthophosphoric acid to the acid to react with and precipitate sufficient Si as $Na_2SiF_6$ to establish an Al/Si mole ratio of 1/0.8–1, (b) separating the $Na_2SiF_6$ from the acid, (c) forming a defluorination slurry by adding to a portion of the acid from (b) a sodium salt of hydrofluoric acid dissolved in defluorinated phosphoric acid and a calcium salt of orthophosphoric acid in amounts to establish an approximate mole ratio of $Al/Si/F/SO_4^=/Ca$ of 1/0.8–1/12–16/1.5–2/4–8 thereby forming a defluorination slurry containing a complex crystalline compound with Al, Si, F, $SO_4$, and Ca as components, (d) thereafter adding to the defluorination slurry in a continuous manner acid treated as in (b) together with a sodium salt of hydrofluoric acid and a calcium salt or orthophosphoric acid in amounts to maintain in the defluorination slurry the said mole ratios of $Al/Si/F/SO_4/Ca$ and form said complex crystalline compound; and, (e) separating the solids formed in (d) from the defluorination slurry.

9. A process as defined in claim 7 in which a part of the defluorination slurry is withdrawn and reacted with a calcium compound selected from the group consisting of calcium carbonate and limestone, thereby forming calcium orthophosphate, which is employed to introduce the calcium component into the remainder of the defluorination slurry in which said complex crystalline compound is formed.

References Cited

UNITED STATES PATENTS 1,487,205   3/1924   Carothers et al. _____ 23—165

FOREIGN PATENTS 467,843   6/1937   Great Britain.

OSCAR R. VERTIZ, *Primary Examiner.*

ARTHUR GREIF, *Assistant Examiner.*